March 15, 1932.  E. FRISELL ET AL  1,849,484

REGULATOR FOR CORN SHELLER FEEDERS

Filed Sept. 16, 1929  2 Sheets-Sheet 1

Inventors
Ernest Frisell
William W. Fox

By Emil F. Lange
Attorney

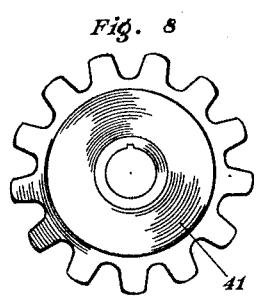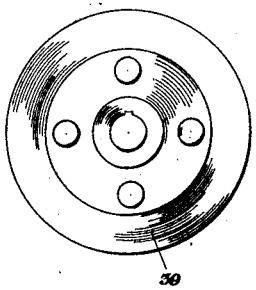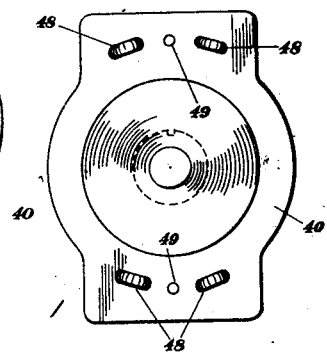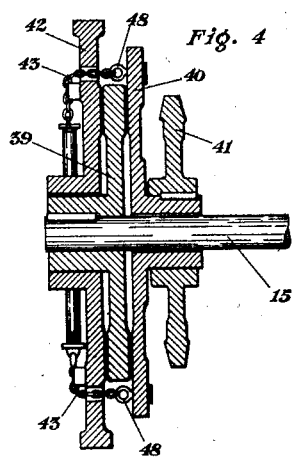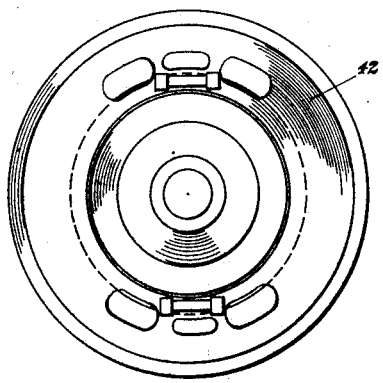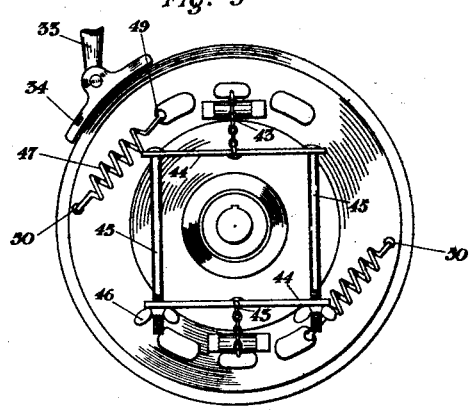

Patented Mar. 15, 1932

1,849,484

UNITED STATES PATENT OFFICE

ERNEST FRISELL, OF LINCOLN, AND WILLIAM W. FOX, OF DAYKIN, NEBRASKA

REGULATOR FOR CORN SHELLER FEEDERS

Application filed September 16, 1929. Serial No. 393,050.

Our invention relates to devices for regulating the feed of corn to the corn sheller, its primary object being the provision of a mechanism for providing a uniform feed so that the corn sheller will not become clogged up.

Another of our objects is the provision of an improved float which is adapted to rest on the stream of corn above the conveyor, the float being sensitive to variations in the feed of the corn.

Another of our objects is the provision of a telescoping float which is adjustable in width so that it may be applied to any corn sheller at present in use.

Another of our objects is the provision of an improved linkage connecting the float and the brake shoe.

Another object which we have in view is the provision of a simple linkage having a counterbalancing means and also adjusting means whereby the pressure of the shoe on the clutch drum may be varied.

Another of our objects is the provision of an improved clutch, the clutch being reversible so that it may be applied to corn shellers regardless of the direction of rotation of the drive shaft.

Having in view these objects and others which will be pointed out in the following description, we will now refer to the drawings, in which Figure 1 is a view in side elevation of a portion of a corn sheller having our regulating device secured thereto.

Figure 3 is a view in side elevation of the clutch.

Figure 4 is a sectional view of the assembled clutch, the section being taken on the diagonal.

Figure 5 is a view in elevation of the driving member of the clutch.

Figure 6 is an elevational view of the stop member of the clutch.

Figure 7 is a view in elevation of the friction member which is adapted to be driven by the driving member of the clutch.

Figure 8 is a view in elevation of the sprocket wheel member of the clutch.

Figure 1:
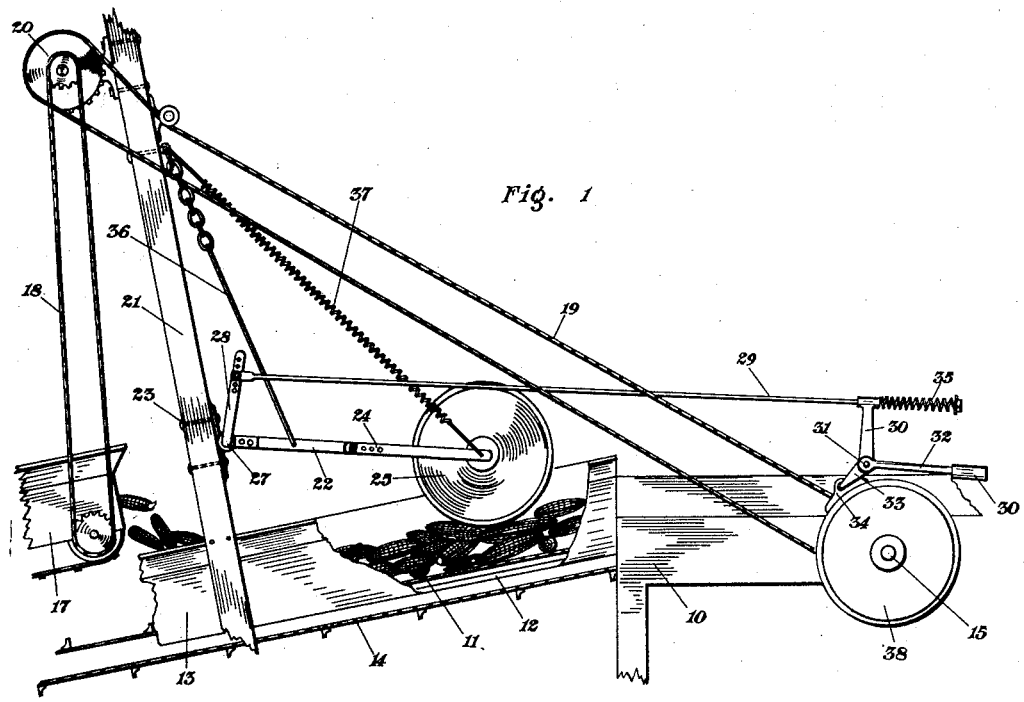

In Figure 1 we show in conventional form a portion of a corn sheller, the details of which are varied in numerous respects in the corn shellers now in use. To the frame 10 is secured a trough 11 through which the corn is conveyed to the shelling apparatus. This trough has a floor 12 and side walls 13. The endless conveyor 14 travels over the floor 12 of the trough so as to carry the ears of corn to the shelling mechanism. The conveyor 14 is driven through connections with the drive shaft 15 which receives power from any suitable source.

The ear corn is fed to the trough 11 in any suitable manner, preferably by mechanical means. These means include some form of chute or trough 17 which is belted or geared in any suitable manner such as through the chains 18 and 19 to be driven by the drive shaft 15. Most corn shellers are provided with the equivalent of a shaft 20 which is driven from the drive shaft 15 and which is supported on a portion of the framework of the sheller such as the standard 21. The shaft 20 is usually provided with means for transmitting power to the conveyor 17.

The conveyor 17 may be fed manually or its receiving end may be positioned in the corn crib or the corn may be dumped into the conveyor from wagons or other receptacles. The feed of the conveyor 17 is thus very irregular and the corn is delivered in irregular quantities to the trough 11. In corn shellers which are not equipped with our device, the ear corn in the trough 11 will sometimes move in a very thin stream and at other times it will move in such large quantities as to clog up the shelling apparatus with the possibility of breaking portions of the sheller. The irregularity in feed results not only in possible damage to the shelling machine but it causes the machine to have a rather low efficiency both in the consumption of power and in the results produced. Our device is designed for the purpose of regulating the feed of ear corn into the trough 11 so that the sheller will run at a substantially uniform rate without danger of the sheller becoming clogged up.

Figure 2:
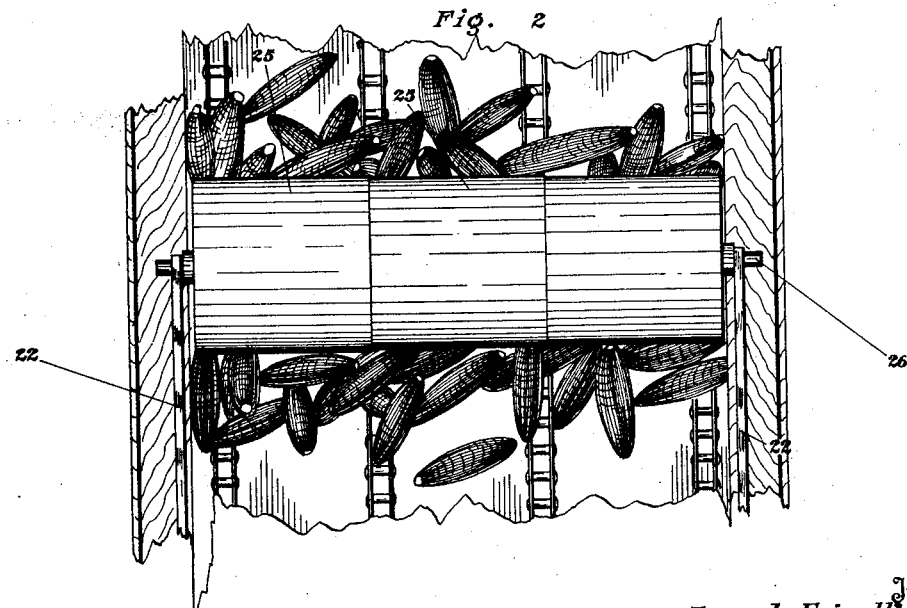
Figure 2 is a plan view of a portion of the corn sheller and showing particularly the telescoping float drum.

The arm 22 is pivotally secured to the standard 21 by means of bolts 23 or the like. The arm 22 is jointed at 24 so that its length may be varied in accordance with the dimensions of the sheller. The arm 22 carries a float 25 at its free extremity, the float being secured to an axle 26, the ends of which are journalled in the arms 22. The float 25 is made adjustable so as to accommodate shellers of various widths. As shown in Figure 2, the float consists of a plurality of sections which are adapted to telescope into each other for the purpose of increasing or decreasing the width of the float. This float as shown in Figure 1 is adapted to rest on the stream of ear corn in the trough 11. The shaft 27 which supports the arms 22 on the standard 21 also carries an arm 28. The link 29 is adjustably secured to the arm 28 and its opposite end portion passes through a sleeve of the arm 30 of a bell crank. The bell crank is pivoted at 31 to a support 32 which is secured to the frame of the machine. The second arm 33 of the bell crank carries the clutch shoe 34. The link 29 is further provided with a buffer spring 35 for reducing shock. It is obvious from an inspection of Figure 1 that the movements of the float 25 are communicated to the clutch shoe 34. The device further includes a flexible link 36 connecting the arms 22 to the standard 21 and a counterbalancing spring 37 also connecting the arms 22 to the standard 21. The flexible link 36 is designed to limit the movement of the float in a downward direction and for this purpose the connections of the link with the standard are adjustable.

The drive shaft 15 is provided with a clutch 38 through which the chains 18 and 19 are driven. The clutch 38 is best shown in Figures 3 to 8 inclusive. Keyed to the shaft 15 is a clutch driving member 39. The driven member of the clutch is shown at 40. Both the driving and the driven members of the clutch are provided with annular flanges which project in opposite directions. While the driving member 39 is keyed to the shaft 15 the driven member 40 has a loose relation with respect to the shaft. The annular flange of the driven member 40 carries a sprocket wheel 41 which is keyed to the annular flange as shown in Figure 4 so that the driven member 40 and the sprocket wheel are in effect integral. The stop member 42 is journalled on the annular flange of the driving member 39. Secured to the driven member 40 at two diametrically opposite points are chains 43 or similar flexible members which pass through apertures in the stop member 42. The ends of these chains are connected to straps 44 which are joined at their ends by means of bolts 45. By tightening or loosening the nuts 46 the tension on the chains 43 is increased or decreased but the important fact is that the variation in tension is uniform on both chains 43. During the rotation of the clutch the chains have an angular relation with respect to the various clutch members and at such times they are under their maximum tension which forces the members 42 and 40 tightly against the driving member 39. The power of the shaft 15 is therefore applied to the members 40 and 42 through frictional engagement with the driving member 39. The springs 47 connecting the parts 40 and 42 normally urge the parts into clutching engagement.

During the operation of the clutch the springs 43 hold the clutch members 40 and 42 in close embrace about the driving member 39 so that the friction between these members causes the rotation of the members 40 and 42 and consequently of the sprocket wheel member 41. At such times the chain is inclined outwardly and forwardly from the member 40 and is thus kept under tension. If the movement of the member 42 is arrested, as for example through the clutch shoe 34, the chain 43 instantly straightens out and becomes slack thus permitting a slight separation of the members 40 and 42 from the driving member 39. At such times the members 40 and 42 will be held against rotation while the shaft 15 with the driving clutch member 39 continues to revolve. If the clutch shoe 34 is then withdrawn the springs 47 restore the tension in the chains 43 to again bring the parts 40 and 42 into frictional engagement with the drive member 39. The engagement and disengagement of the clutch parts is thus entirely automatic.

Since the corn shellers to which we wish to apply our device vary between wide limits and in many respects, it is necessary for us to provide a clutch which will operate in either direction, the direction of rotation not being uniform in all corn shellers. Our clutch has therefore been designed to be reversed with the least possible adjustment. As before stated, the chains 43 are secured to the driven member 40 in the manner shown in Figure 4. In Figure 7 we show an elevational view of the member 40 showing particularly the points of attachment of both the chains 43 and the springs 47. The ends of the chains 43 are secured to eyes 48 projecting from the member 40. It will be noted that there are two pairs of eyes 48. The point of attachment in each case is in the rear eye 48 with respect to the direction of movement. To reverse the direction of the clutch action it is therefore necessary to change the point of attachment of the chain 43 to the eye which will be in the rear during the rotation of the clutch. The springs 47 are attached to the member 40 at the points 49 and these points of attachment need not be disturbed. It is, however, necessary to reverse the direction of action of the springs but this is easily accomplished by providing two diametrically opposite pins 49 in the stop member 42 to which the ends of the springs are detachably secured. The reversal of the clutch thus necessitates release of the springs 47 from the pins 49, and the shifting of these connections through the opposite apertures of the pairs of elongated apertures and to the opposite pins 50. The action of the springs 47 will then be to shift the members 40 and 42 axially with reference to each other until the pins 49 are at the opposite ends of the slots.

Having thus described our invention in such full, clear, and exact terms that its construction and operation will be readily understood by others skilled in the art to which it pertains, what we claim as new and desire to secure by Letters Patent of the United States is:

1. In a device for attachment to a corn sheller or the like for regulating the feed thereto, a float adapted to rest on the stream of corn entering the sheller, said float being adjustable in length, a pair of links secured to said float and adapted to be secured to a fixed part of the sheller, means for adjusting the length of said links, means for varying the height of said float above the bottom of the stream of corn entering the sheller, and means actuated by said links for automatically reducing the feed of corn when the feed of corn to the sheller becomes excessive.

2. In a device for attachment to a corn sheller or the like for regulating the feed thereto, a cylindrical float comprising a plurality of telescoping cylindrical sections, said float adapted to rest on the stream of corn entering the shelter, a pair of links secured to said float and adapted to be secured to a fixed part of the sheller, means for adjusting the length of said links, means for varying the height of said float above the bottom of the stream of corn entering the sheller, and means actuated by said links for automatically reducing the feed of corn when the feed of corn to the sheller becomes excessive.

3. In a device for attachment to a corn sheller or the like for regulating the feed thereto, a cylindrical float adapted to rest on the stream of corn entering the sheller, a pair of arms secured to said float and adapted to be pivotally secured to the frame of the sheller, means for varying the length of said arms, a pair of flexible and adjustable links secured to said arms and adapted to be secured to the sheller frame for adjustably limiting the downward movement of said float, an arm projecting angularly from one of said pair of arms at the pivotal axis on the sheller frame, a clutch, a link connecting said last named arm to said clutch and having an adjustable connection with said last named arm, and a buffer interposed between said last named link and said clutch.

In testimony whereof we affix our signatures.

WILLIAM W. FOX.
ERNEST FRISELL.